J. E. Emerson,
Saw Teeth.
Nº 49,868.      Patented Sep. 12, 1865.
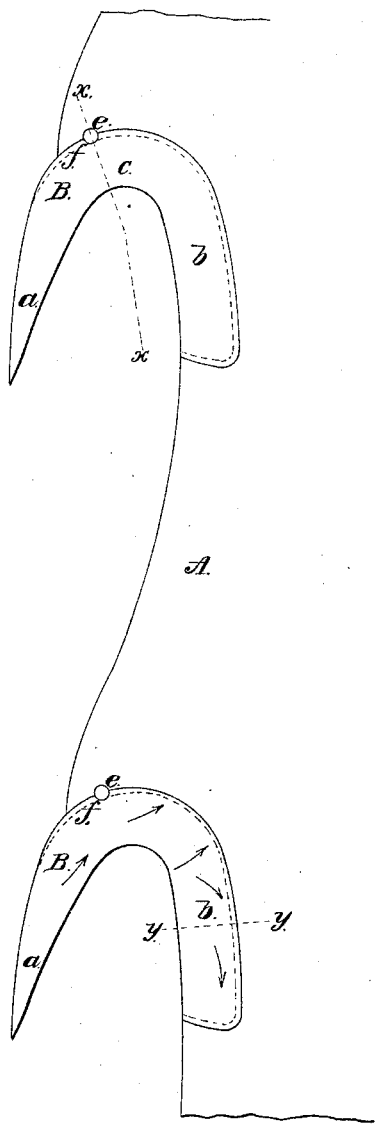
Witnesses:
Inventor:

UNITED STATES PATENT OFFICE.

J. E. EMERSON, OF TRENTON, NEW JERSEY.

IMPROVEMENT IN SAW-TEETH FOR SAWS.

Specification forming part of Letters Patent No. 49,868, dated September 12, 1865.

*To all whom it may concern:*

Be it known that I, J. E. EMERSON, of Trenton, in the county of Mercer and State of New Jersey, have invented a new and useful Improvement in Circular Saws; and I do hereby declare that the following is a full, clear, and exact description thereof, which will enable those skilled in the art to make and use the same, reference being had to the accompanying drawings, forming part of this specification, in which—

Figure 1 is a side view of a portion of a circular saw provided with teeth according to my invention; Fig. 2, a section of the same taken in the line $x\ x$; Fig. 3, a section of the same taken in the line $y\ y$.

Similar letters of reference indicate corresponding parts.

This invention relates to an improved circular saw of that class which are provided with removable or detachable teeth; and it consists in securing the teeth to the saw in such a manner that they cannot become casually loose, and will be capable of being readily secured to the saw and detached from it.

A represents a portion of a circular saw, and B B two teeth thereof. These teeth are of curved form, the outer or tooth portion, $a$, being taper and having a proper raking position, and connected to the inner part, $b$, which is straight, by a semicircular bend, $c$, as shown clearly in Fig. 1.

The saw A is hollowed out or has recesses made in it at suitable or equal distances apart to receive the teeth B, the semicircular part $c$ and the shank or inner part, $b$, being in the saw, and the outer tooth part, $a$, projecting out from the saw in a raking position.

The outer edge of the bend $e$ and shank portion $b$, as well as the end of the latter, has a V-shaped groove, $d$, made in them to receive a corresponding-shaped edge made in the recesses of the saw, and the teeth and saw have holes, $e$, drilled in them, one half of the holes being in the teeth and the other half in the saw. These holes receive pins $f$, which secure the teeth in the saw.

From the above description it will be seen that when the saw is at work the resistance offered by the wood to the saw-teeth will have a tendency to secure the latter more firmly in the saw, the direction of the pressure being indicated by the arrows. The teeth therefore cannot casually work loose, as is the case with other saws provided with detachable teeth.

Another advantage attending my invention is that the teeth do not require to be driven violently into the saw, so as to expand the same and cause it to buckle, as is the case where the teeth are provided with shanks fitted in radial slots in the saw. The teeth thus fitted or driven in the saw are difficult to remove, and the saw is frequently checked or cracked thereby.

I claim as new and desire to secure by Letters Patent—

The curved tooth $a\ c\ b$, constructed and applied to a saw-plate in the manner herein specified.

J. E. EMERSON.

Witnesses:
M. M. LIVINGSTON,
C. L. TOPLIFF.